United States Patent
Othmer

(10) Patent No.: US 8,767,929 B2
(45) Date of Patent: Jul. 1, 2014

(54) SYSTEMS AND METHODS FOR DISPLAYING PRESENCE INFORMATION IN COMMUNICATION DEVICES

(75) Inventor: Konstantin Othmer, Mountain View, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 927 days.

(21) Appl. No.: 12/356,440

(22) Filed: Jan. 20, 2009

(65) Prior Publication Data

US 2010/0184419 A1 Jul. 22, 2010

(51) Int. Cl.
 *H04M 1/56* (2006.01)
 *H04W 24/00* (2009.01)

(52) U.S. Cl.
 USPC .................. 379/142.11; 379/142.1; 455/456.1

(58) Field of Classification Search
 CPC ...................................................... G06Q 10/109
 USPC ...................................... 455/418; 379/142.11
 See application file for complete search history.

(56) References Cited

U.S. PATENT DOCUMENTS

| | | | |
|---|---|---|---|
| 2003/0206619 A1* | 11/2003 | Curbow et al. | 379/210.01 |
| 2005/0170847 A1 | 8/2005 | Karlsson et al. | |
| 2007/0036137 A1* | 2/2007 | Horner et al. | 370/352 |
| 2007/0087762 A1 | 4/2007 | Karlsson et al. | |
| 2007/0088818 A1* | 4/2007 | Roberts et al. | 709/224 |
| 2007/0121867 A1* | 5/2007 | Ozugur et al. | 379/201.1 |

FOREIGN PATENT DOCUMENTS

WO 2007-016059 A2 2/2007

OTHER PUBLICATIONS

International Search Report and Written Opinion, mailed Sep. 2, 2010, as issued in connection with Patent Application No. PCT/US2010/021215, filed on Jan. 15, 2010.

\* cited by examiner

*Primary Examiner* — Huy C Ho
(74) *Attorney, Agent, or Firm* — Workman Nydegger

(57) ABSTRACT

A communications system may include a communication device that may be configured to display presence information for one or more contacts. The presence information may include a current time for a location associated with the contact, a time zone associated with the contact, status information, and/or other suitable presence information for the contact. The presence information may be automatically changed in response to a location associated with the contact changing. The presence information may be generated using a schedule associated with a contact and a current time for a location associated with a contact.

13 Claims, 9 Drawing Sheets

SYSTEMS AND METHODS FOR DISPLAYING PRESENCE INFORMATION IN COMMUNICATION DEVICES

BACKGROUND OF THE INVENTION

1. Field of the Invention

The present invention generally relates to communication devices and in particular to displaying presence information in communication devices.

2. Background Technology

People use a variety of communication devices, such as personal computers, landline telephones, wireless telephones, PDAs, laptop computers, set-top boxes and other communication devices. Using these devices, people may communicate via voice calls; email; SMS (Short Message Service) messages; EMS (Enhanced Messaging Service) messages; MMS (Multimedia Message Service) messages; voice messages (also referred to as instant voice messages, VoiceSMS messages and Vnotes® messages); podcasts; audio files; video files; and/or other types of communications.

Typically, some sort of audible and/or visual notification accompanies these communications. For example, wireless telephones may ring for incoming telephone calls and may flash an LED and/or beep for received SMS messages. Some communication devices may include user-configurable profiles that define what (if any) notifications should be used for such communications.

In many cases, such as where a user relies primarily on a single communication device for his or her communicating needs, the user will simply leave all notifications enabled at all times to ensure that the user will be able to respond to important communications. Unfortunately, this allows all communications—whether important or trivial, whether urgent or not—to be received and thus permits the trivial/non-urgent communications' notifications to unnecessarily disturb the user.

In other cases, a user may want to disable notifications, but may simply forget to do so, thus permitting the notifications to unnecessarily disturb the user.

SUMMARY

A need therefore exists for systems and methods that eliminate or reduce the disadvantages and problems listed above and/or other disadvantages and problems.

One aspect is a communication device that may be configured to display one or more contacts and, if desired, presence information for the contacts. The presence information may include a current time for a location associated with the contact, a time zone associated with the contact, status information, and/or other suitable presence information for the contact. Significantly, after seeing the displayed presence information, a user of a communication device may decide not to initiate trivial or non-urgent communication. For example, if the presence information indicates that the current time for a location associated with the contact is late at night, the user may decide not to call the contact to discuss a trivial or non-urgent matter. Instead, after seeing that the current time is late at night, a user of a communication device may decide to send a less intrusive communication (such as an SMS message) or may decide to postpone communication until a more appropriate time. Likewise, if the presence information indicates that the contact does not wish to be disturbed, the user may decide to postpone trivial or non-urgent communication. Accordingly, the displayed presence information may help deter trivial/non-urgent communications and thus avoid unnecessarily disturbing the contacts with their associated audible and visual notifications.

Another aspect is a communication device that may be configured to display presence information that may be automatically changed in response to a contact's communication device being moved from one time zone to a different time zone, for instance, when the contact travels to a remote destination with his or her communication device. For example, when a contact from California travels with her communication device to New York City on a business trip, the contact's presence information may be automatically changed to indicate the time in New York City (that is, Eastern time), instead of the time in California (that is, Pacific time). Accordingly, when a user of the communication device notices the Eastern time being displayed for the contact, the user may make a more informed decision as to whether the user should initiate communication with the contact.

Yet another aspect is a communication device that may be configured to display presence information that may be generated using a schedule associated with a contact and a current time for a location associated with a contact. In some instances, the current time may be the current time for a location of the contact's communication device. In such instances, when the contact has travelled to a remote destination with his or her communication device, the presence information may be generated using the schedule and the time at the remote destination.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which.

DETAILED DESCRIPTION OF THE PREFERRED EMBODIMENTS

Figure 1:
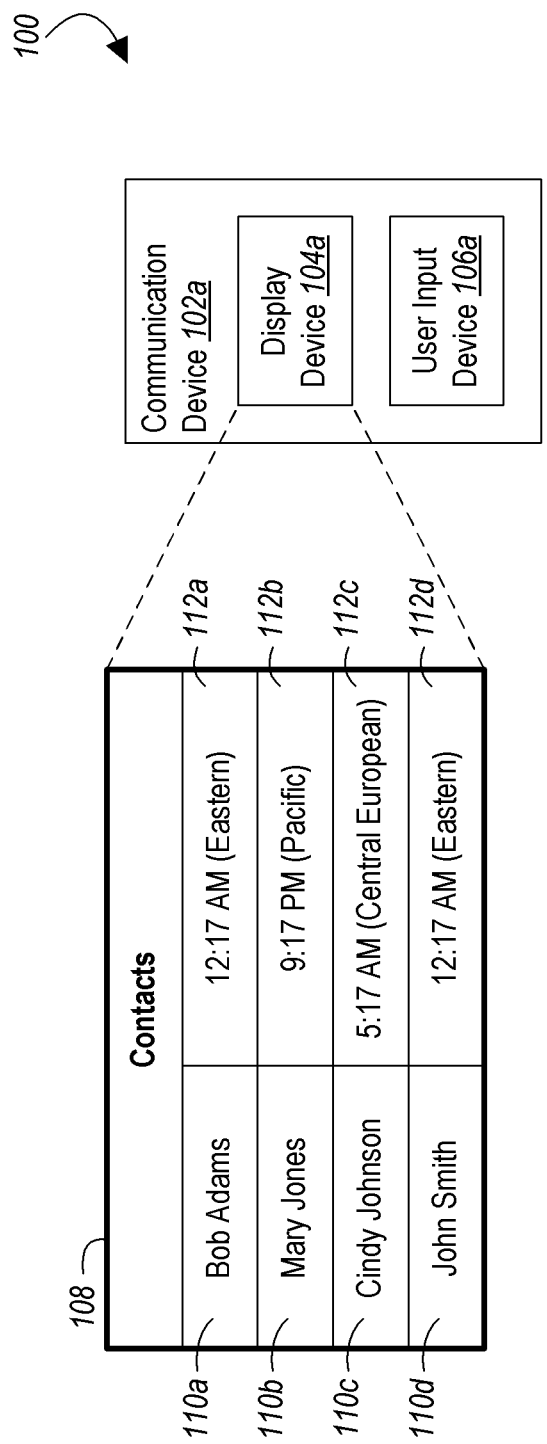
FIG. 1 is a diagram of an exemplary communications system.

As shown in FIG. 1, a communications system 100 may include one or more communication devices 102, such as a communication device 102*a*. Exemplary communication devices 102 may include personal computers, landline telephones, wireless telephones, PDAs, laptop computers, set-top boxes and other communication devices. The communication devices 102 may be configured to communicate via voice calls; email; SMS (Short Message Service) messages; EMS (Enhanced Messaging Service) messages; MMS (Multimedia Message Service) messages; voice messages (also referred to as instant voice messages, VoiceSMS messages and Vnotes® messages); podcasts; audio files; video files; and/or other types of communications.

To facilitate this communication, the communication devices 102 may include, or be connected to, a display device 104 and/or a user input device 106. Exemplary display devices 104 may include LCDs, monitors, and other display devices. Exemplary user input devices 106 may include keyboards, keypads, click wheels, mice, mouse touch pads, mouse knobs, mouse balls, mouse roller wheels, touch-sensitive screens (such as touch screens, touch pads, and the like), microphones, video cameras, and other user input devices.

The communication devices 102 may be configured to display one or more contacts and, if desired, presence information for the contacts. The displayed presence information for a contact may include a current time for a location associated with the contact, a time zone associated with the contact, status information, and/or other suitable presence information for the contact. The contacts and presence information may be displayed in a contact list, a call history list (e.g. a dialed number list, a missed call list, etc.) or any other type of user interface.

Significantly, after seeing the displayed presence information, a user of a communication device 102 may decide not to initiate trivial or non-urgent communication. For example, if the presence information indicates that the current time for a location associated with the contact is late at night, the user may decide not to call the contact to discuss a trivial or non-urgent matter. Instead, after seeing that the current time is late at night, a user of a communication device 102 may decide to send a less intrusive communication (such as an SMS message) or may decide to postpone communication until a more appropriate time. Likewise, if the presence information indicates that the contact does not wish to be disturbed, the user may decide to postpone trivial or non-urgent communication. Accordingly, the displayed presence information may help deter trivial/non-urgent communications and thus avoid unnecessarily disturbing the contacts.

In further detail, as shown in FIG. 1, the communication device 102*a* may be configured to display a user interface 108 using, for instance, the display device 104*a*. The user interface 108 may include a listing of one or more contacts 110. The user interface 108 may also include presence information 112 for some or all of the contacts 110.

As shown in FIG. 1, the presence information 112 may include a current time for a location associated with a contact 110 and/or a time zone associated with the contact. For example, the presence information 112*a* for contact 110*a* ("Bob Adams") indicates a current time for a location associated with the contact 110*a* ("12:17 AM") and a time zone associated with the contact 110*a* ("Eastern"); the presence information 112*b* for contact 110*b* ("Mary Jones") indicates a current time for a location associated with the contact 110*b* ("9:17 PM") and a time zone associated with the contact 110*b* ("Pacific"); the presence information 112*c* for contact 110*c* ("Cindy Johnson") indicates a current time for a location associated with the contact 110*c* ("5:17 AM") and a time zone associated with the contact 110*c* ("Central European"); and the presence information 112*d* for contact 110*d* ("John Smith") indicates a current time for a location associated with the contact 110*d* ("12:17 AM") and a time zone associated with the contact 110*d* ("Eastern").

Significantly, after seeing the presence information 112, a user of the communication device 102*a* may be better able to decide whether to initiate communication. For instance, if Mary Jones asked the user to call her after dinner, the user may—after seeing the presence information 112*b* indicating a current time of 9:17 PM—may reasonably infer that Mary is done with dinner and may give her a call. Also, if the user knows that Bob Adams likes to go to bed early, the user may—after seeing the presence information 112*a* indicating a current time of 12:17 AM—decide not to call or message Bob unless the user has a particularly important or urgent matter to discuss with Bob. In contrast, if the user knows that John Smith routinely stays up well past midnight, the user may—after seeing the presence information 112*d* indicating a current time of 12:17 AM—decide to call or message John regardless of the particular importance of the matter. In addition, after seeing the presence information 112*c* indicating the Central European time zone, the user may remember that Cindy Johnson had mentioned she was going on a trip to Spain and thus decide to not to call and interrupt her vacation. But even if the user didn't know Cindy was on vacation, the user may still reasonably conclude that it would be inappropriate to call or message Cindy given the presence information 112*c* indicates a current time of 5:17 AM.

Figure 2:
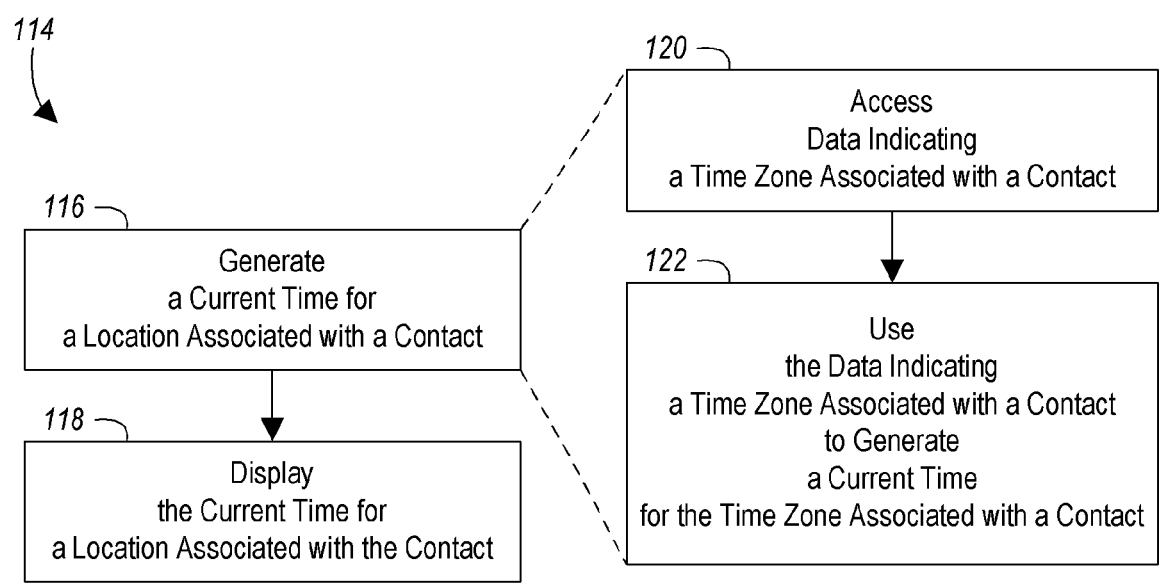
FIG. 2 is a flowchart of an exemplary method.

As shown in FIG. 2, a method 114 may be used to display presence information 112. In particular, at a block 116, a current time for a location associated with a contact 110 may be generated, and at a block 118, the current time may be displayed. In some embodiments, the communication device 102*a* may be configured to generate the current time at the block 116 and to display the current time at the block 118. In some embodiments, a server may be configured to generate the current time at the block 116 and push or otherwise send the current time to the communication device 102*a*, which may then display the current time at the block 118. If desired, the current time may be generated by accessing data indicating a time zone associated with a contact at a block 120 and, at block 122, using the data indicating a time zone to generate a current time for the time zone. For example, in some embodiments, a server may be configured to push or otherwise send the data indicating a time zone associated with a contact to the communication device 102*a*, which may use the data indicating a time zone to generate and display a current time for the time zone as part of the presence information 112. In some embodiments, the time zone associated with a contact may also be displayed as part of the presence information 112. Of course, the blocks 120 and 122 are not required and thus the current time for a location associated with a contact 110 may be generated in other suitable fashions at block 116.

As shown above, the communication device 102*a* may display presence information 112, which may include a current time for a location associated with a contact 110 and/or a time zone associated with the contact. In some cases, the location associated with the contact 110 may be a location of another communication device, which may be associated with the contact (e.g., the other communication device is the contact's wireless telephone, laptop computer, etc.). Significantly, when the other communication device is associated with the contact 110, the other communication device's location may be used to facilitate the display of the contact's presence information 112. In some cases, the location associated with the contact 110 could be a location of a mobile communication device associated with the contact. If desired, the contact's presence information 112 may be automatically changed in response to the mobile communication device being moved from one time zone to a different time zone (e.g. when the contact travels to a remote destination with his or her mobile communication device). For example, a server may be configured to—in response to the mobile communication device being moved from one time zone to a different time zone—push or otherwise send data indicating the new time zone to the communication device 102a, which may use that data to generate and display the current time for a location associated with the contact. The communication device 102a may also display the new time zone itself, if desired.

Figure 3:
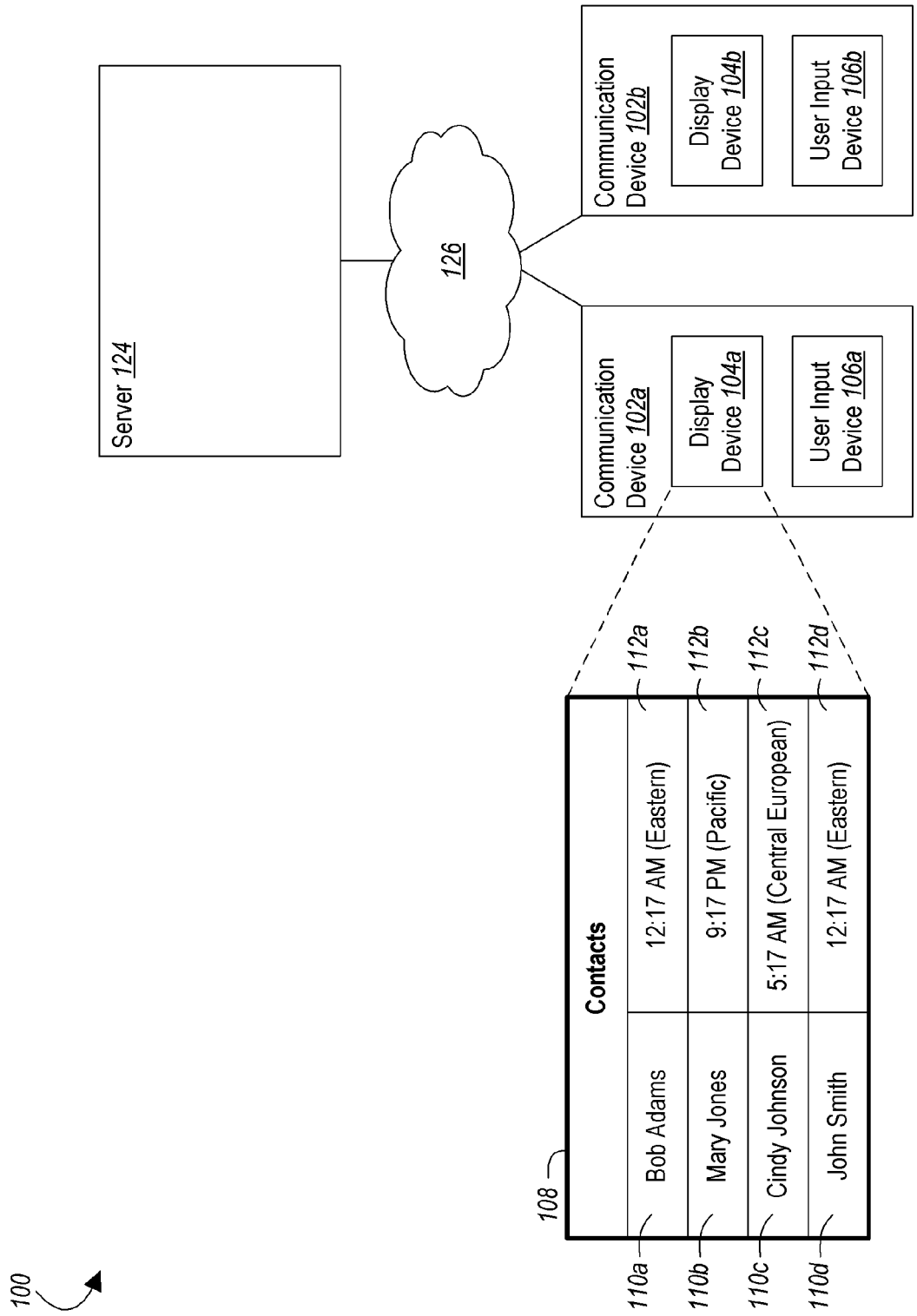
FIG. 3 is a diagram of an exemplary communications system.

In further detail, as shown in FIG. 3, the communications system 100 may include a server 124 and a plurality of communication devices 102, such as the communication device 102a and one or more communication devices 102b. The communications system 100 may also include one or more connections and/or networks 126 via which the communication devices 102a, 102b and the server 124 may communicate with each other.

In some instances, a communication device 102b may be associated with a contact 110. When the communication device 102b is associated with the contact 110, the location of the communication device 102b may be used to facilitate the display of presence information 112 that includes a current time for a location associated with the contact and/or a time zone associated with a contact.

Figure 4:
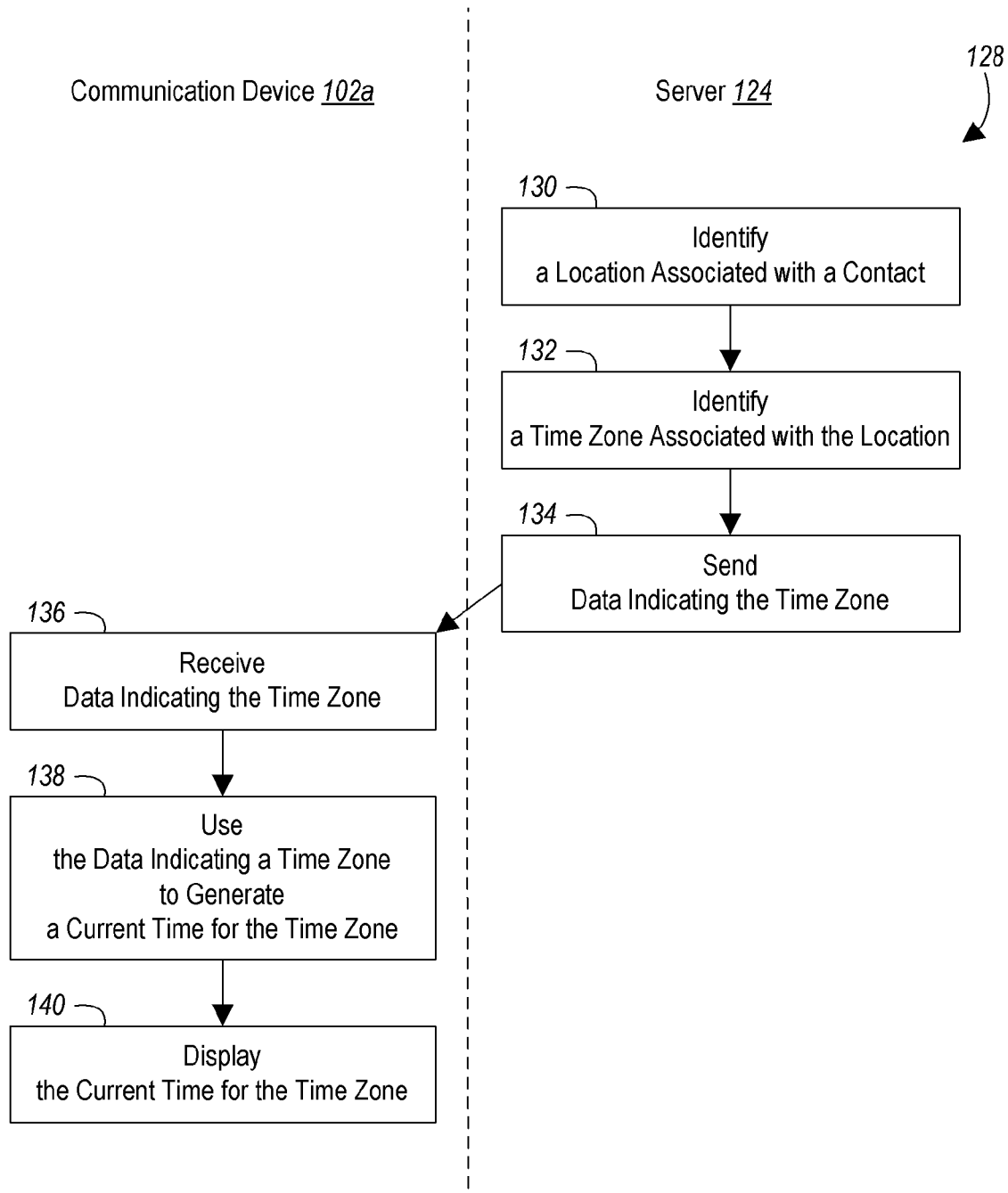
FIG. 4 is a flowchart of an exemplary method.

For example, with reference to method 128 shown in FIG. 4, the server 124 may identify a location associated with a contact 110 at a block 130; and in some cases, this location may be a location of a communication device 102b associated with the contact. At a block 132, the server 124 may use the location associated with the contact 110 to identify a time zone associated with the location. The server 124 may, at a block 134, send data indicating the time zone to the communication device 102a. The communication device 102a may receive the data indicating the time zone at a block 136, may use the data indicating the time zone to generate a current time for the time zone at a block 138, and may display the current time for the time zone as part of presence information 112 for the contact 110 at a block 140. The communication device 102a may also, at the block 140, display the time zone itself as part of the presence information 112 for the contact 110.

Significantly, the server 124 may be configured to determine whether the location associated with the contact has changed and, if so, whether the time zone associated with the new location is different from the time zone associated with the previous location. In response to determining that the time zone associated with the new location is different from the time zone associated with the previous location, the server 124 may automatically send data indicating the new time zone to the communication device 102a, which may use that data to generate and display the current time for a location associated with the contact and/or the new time zone itself. Thus, when the communication device 102b associated with a contact 110 is a mobile communication device, the server 124 may—in response to the mobile communication device being moved from one time zone to a new time zone—automatically send data indicating the new time zone to the communication device 102a, which may use that data to generate and display the current time for the new time zone and/or display the new time zone itself.

The server 124 may identify the location of a communication device 102b associated with a contact 110 in a variety of ways. The server 124 could identify the location by using an IP address associated with the communication device 102b, using the locations of one or more wireless telephone towers able to communicate with the communication device 102b, using the locations of one or more wireless access points able to communicate with the communication device 102b, using GPS data received from the communication device 102b, or any other suitable means of identifying the location of the communication device 102b.

Although the server 124 may identify the location associated with a contact 110 by identifying a location of a communication device 102b associated with the contact, this is not required. For example, the server 124 may identify the location associated with a contact 110 by merely accessing data indicating the location, which data may be maintained by the contact himself or herself. The contact 110 could, for instance, create and/or change the location data by using a web portal, by setting preferences on a messaging program (such as, an instant messenger or an email program), or by any other suitable means.

Moreover, although the server 124 may, at block 132, use a location associated with a contact 110 to identify a time zone associated with the location, this is not required. For example, the server 124 may identify a time zone associated with the location and/or contact 110 by merely accessing data indicating the time zone, which data may be maintained by the contact himself or herself. The contact 110 could, for instance, create and/or change the time zone data by using a web portal, by setting preferences on a messaging program (such as, an instant messenger or an email program), or by any other suitable means.

In addition, the communication device 102b of the contact 110 may be configured to perform some or all of the blocks 130, 132, 134, if desired. For instance, at the block 130, the contact's communication device 102b could identify a location associated with the contact (e.g., the location of the communication device 102b itself or a location specified by the contact), identify a time zone associated with that location at the block 132, and at the block 134, may send data indicating the time zone to the communication device 102a via the server 124, the connections or networks 126, and/or any other suitable means.

Figure 5:
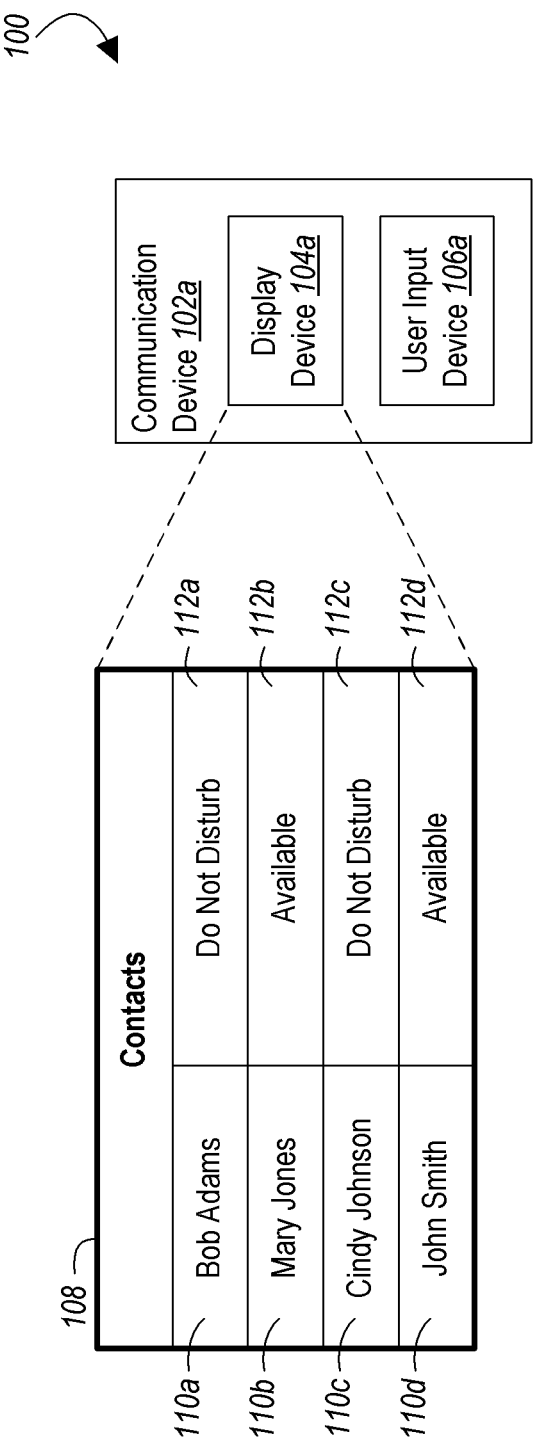
FIG. 5 is a diagram of an exemplary communications system.

If desired, the communication device 102a may be configured to display other presence information 112 in addition to, or in place of, a current time for a location associated with the contact 110 and a time zone associated with the contact. For example, as shown in FIG. 5, the presence information 112 may include status information for the contact 110, such as the contact is willing to communicate (e.g., "Available") or that the contact is not willing to communicate (e.g., "Do Not Disturb"). Of course, the presence information 112 may include other status information for a contact 110, such as "On Vacation"; "Out of the Office"; "Out for the Day"; "At Lunch"; "Sick"; "At Doctor's"; "In Meeting"; "Away"; "Idle"; and other statuses.

Figure 6:
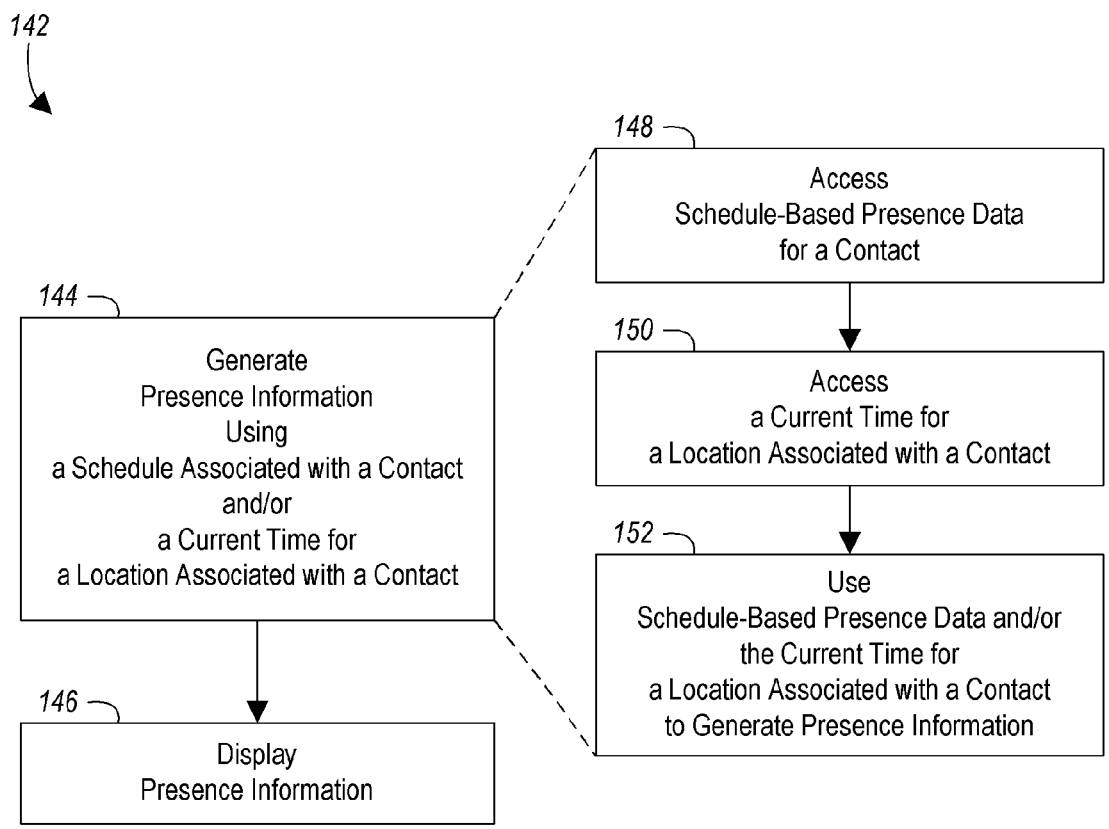
FIG. 6 is a flowchart of an exemplary method.

A method 142 shown in FIG. 6 may be used to display this status information and/or any other presence information 112 for a contact 110. In particular, at a block 144, presence information 112 for a contact 110 may be generated using a schedule associated with the contact and/or a current time for a location associated with the contact; and at block 146, the presence information 112 may be displayed. In some embodiments, the communication device 102a may be configured to generate the presence information 112 at the block 144 and to display the presence information 112 at the block 146. In some embodiments, the server 124 may be configured to generate the presence information 112 at the block 144 and push or otherwise send the presence information 112 to the communication device 102a, which may then display the presence information 112 at the block 146.

As shown in FIG. 6, the presence information 112 for a contact 110 may be generated by accessing schedule-based presence data at a block 148, accessing a current time for a location associated with the contact at a block 150, and at a block 152, using the schedule-based presence data and the current time to generate the presence information 112 for the contact. For example, at the block 148, the server 124 may access a contact's schedule-based presence data 154 (FIG. 7), which may be stored on a storage device 156 that may be connected to or form part of the server 124. At the block 150, the server 124 may access the current time for a location associated with the contact 110, for instance, by generating the current time as discussed above with reference to FIGS. 1-4. The server 124 may, at a block 152, use the contact's schedule-based presence data 154 and the current time to generate the presence information 112 for the contact and then push or otherwise send the presence information to the communication device 102a, which may then display the presence information at the block 146.

In some cases, the server 124 may send a contact's schedule-based presence data 154 (FIG. 7) to the communication device 102a (and/or the contact's schedule-based presence data 154 may have been created, edited and/or stored on a storage device of the communication device 102a); and the communication device 102a may access the current time for a location associated with the contact 110, for instance, by generating the current time as discussed above with reference to FIGS. 1-4. In such cases, the communication device 102a may, at a block 152, use the contact's schedule-based presence data 154 and the current time to generate the presence information 112 for the contact and may display the presence information at the block 146.

Figure 7:
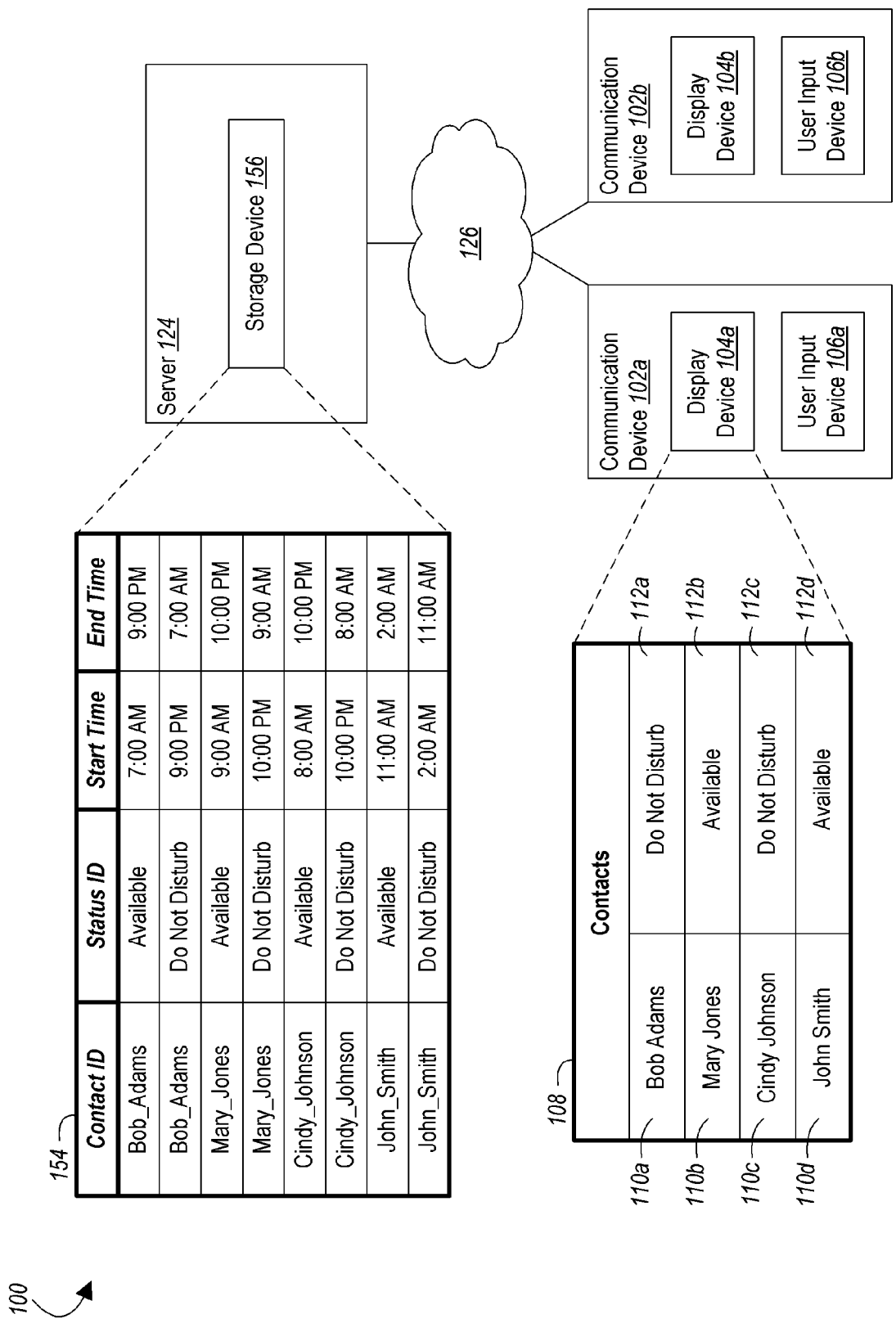
FIG. 7 is a diagram of an exemplary communications system.

As shown in FIG. 7, the schedule-based presence data 154 for a contact 110 may include data indicating the contact ("Contact ID"), data indicating a status ("Status ID"), data indicating a start time for the status ("Start Time"), data indicating an end time for the status ("End Time"), and/or other schedule-based presence data. If desired, the contact 110 could, for instance, create and/or change the schedule-based presence data 154 by using a web portal, by setting preferences on a messaging program (such as, an instant messenger or an email program), or by any other suitable means.

Desirably, this may allow a contact 110 to create and maintain his or her own individual schedule of statuses and then allow the presence information 112 to be automatically generated and displayed based on that schedule. For example, by comparing the current time for a location associated with the contact 110 and the "Start Time" of the schedule-based presence data 154, the server 124 could determine that the presence information 112 should be updated and then push or otherwise send the "Status ID", the "Contact ID" and/or any other portion of the schedule-based presence data 154 to the communication device 102a, which may then display the status indicated by the "Status ID" as part of the contact's presence information 112. In another example, the server 124 may have already sent the schedule-based presence data 154 (FIG. 7) to the communication device 102a, which may store the schedule-based presence data 154 locally in a storage device of the communication device 102a. In this example, by comparing the current time for a location associated with the contact and the "Start Time" of the schedule-based presence data 154, the communication device 102a could determine that the presence information 112 should be updated and thus automatically display the status indicated by the "Status ID" as part of the contact's presence information 112.

Of course, a user of the communication device 102a could create and/or change the schedule-based presence data 154 by using a web portal, using an interface provided on the communication device 102a, or by any other suitable means. In some instances, the schedule-based presence data 154 may include default start times and end times, which may or may not be editable, and which may apply to individual contacts or (if desired) groups of contacts, such as some or all of the contacts listed on the communication device 102a.

As discussed above, a location associated with a contact 110 could be a location of a mobile communication device associated with the contact (e.g., the contact's wireless telephone, laptop computer, etc.). If desired, the contact's presence information 112 may be automatically changed in response to the mobile communication device being moved from one time zone to a different time zone (e.g. when the contact travels to a remote destination with his or her mobile communication device). For example, a server may be configured to—in response to the mobile communication device being moved from one time zone to a different time zone—generate updated presence information 112 for the contact using the schedule-based presence data 154 and the current time for the new time zone. The server may then push or otherwise send the updated presence information 112 to the communication device 102a, which may then display the updated presence information 112. In another example, where the server 124 has already sent the schedule-based presence data 154 (FIG. 7) to the communication device 102a, the server 124 may—in response to the mobile communication device being moved from one time zone to a new time zone—automatically send data indicating the new time zone to the communication device 102a, and the communication device 102a could then—by comparing the current time for the new time zone and the "Start Time" of the locally stored schedule-based presence data 154—determine that the presence information 112 should be updated and thus automatically display the status indicated by the "Status ID" as part of the contact's presence information 112.

In some instances, the communication device 102b of the contact 110 may be configured to perform some or all of the blocks 148, 150, 152, if desired. For instance, at the block 148, the contact's communication device 102b could access schedule-based presence data (e.g., schedule-based presence data 154 stored locally on a storage device of the contact's communication device), access a current time for a location associated with the contact at block 150 (e.g., the location of the communication device 102b itself or a location specified by the contact), and at the block 152, use the schedule-based presence data and the current time to generate the presence information 112 for the contact. The contact's communication device 102b could push or otherwise send the presence information 112 to the communication device 102a via the server 124, the connections or networks 126, and/or any other suitable means. Upon receipt of the presence information 112, the communication device 102a could display the presence information.

In some instances, the communication device 102a may be configured to display a schedule-based confirmation prompt in response to an attempt to use the communication device 102a to call or message a contact 110. For example, when the communication device 102a is used to dial a contact (e.g. by selecting the contact from a menu or by manually dialing a number that matches the contact's number), the communication device 102a could—depending on a defined schedule—display a prompt that may allow the user to put the call through, cancel or send a message instead (e.g., open a messaging interface used to create and/or send an SMS message, email message, etc.). Similarly, when the communication device 102*a* receives user input indicating that a message should be sent, the communication device 102*a* could—depending on a defined schedule—display a prompt that may allow the user to send the message, discard the message, or save the message for subsequent sending or deletion.

Figure 8:
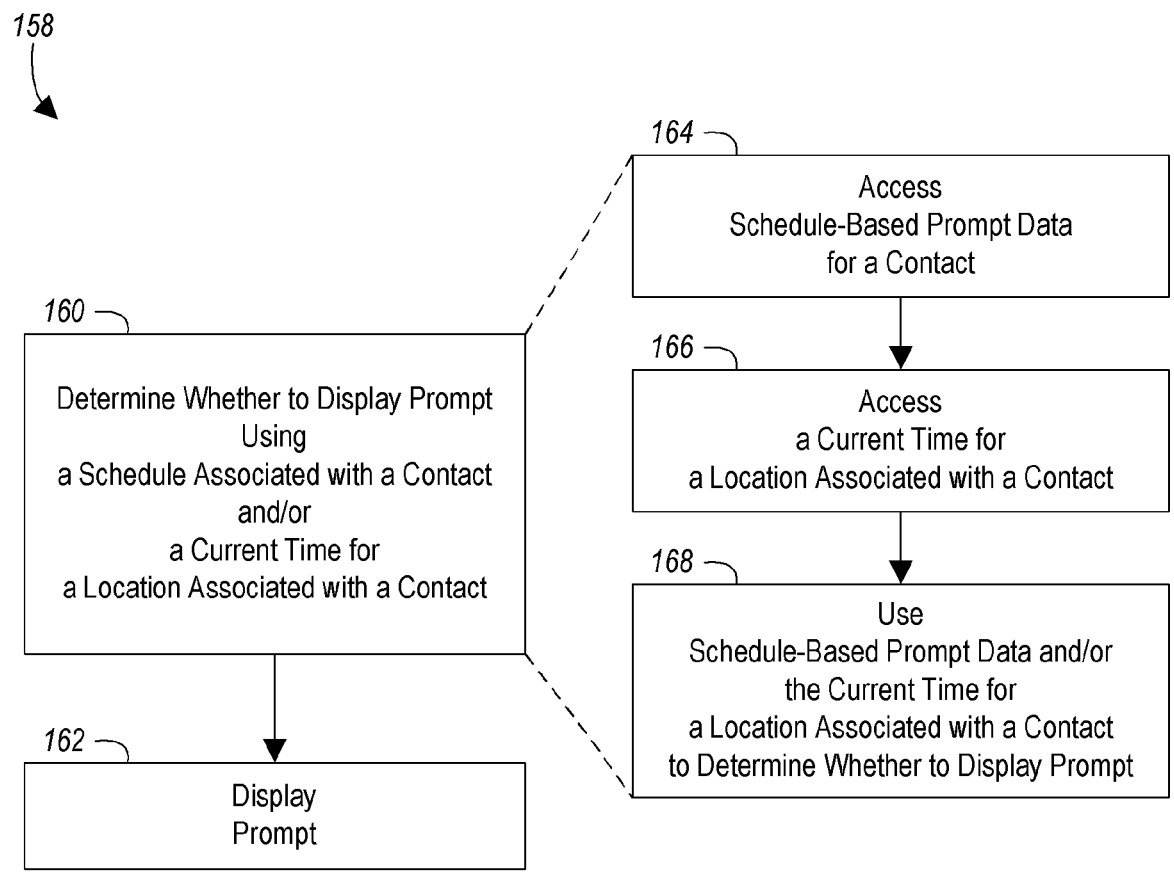
FIG. 8 is a flowchart of an exemplary method.

A method 158 shown in FIG. 8 may be used to determine whether to display a confirmation prompt in response to an attempt to use the communication device 102*a* to call or message a contact 110. In particular, in response to an attempt to use the communication device 102*a* to call or message a contact 110, it may be determined, at a block 160, whether to display a confirmation prompt using a schedule associated with the contact and/or a current time for a location associated with the contact; and at block 162, the confirmation prompt may be displayed if it is determined that the confirmation prompt should be displayed. However, if it is determined that the confirmation prompt should not be displayed, the communication device 102*a* may proceed to make the attempted call or send the attempted message.

As shown in FIG. 8, this determination may be made by accessing schedule-based prompt data for a contact at a block 164, accessing a current time for a location associated with the contact at a block 166, and at a block 168, using the schedule-based prompt data and the current time to determine whether to display the prompt. For example, at the block 164, the server 124 may access a contact's schedule-based prompt data 170 (FIG. 9), which may be stored on a storage device 172 that may be connected to or form part of the server 124. At the block 166, the server 124 may access the current time for a location associated with the contact 110, for instance, by generating the current time as discussed above with reference to FIGS. 1-4. The server 124 may, at a block 168, use the contact's schedule-based prompt data 170 and the current time to determine whether the confirmation prompt should be displayed and then push or otherwise send information indicating whether the confirmation prompt should be displayed to the communication device 102*a*. The communication device 102*a* may then display the confirmation prompt if the information indicates that the confirmation prompt should be displayed. However if the information indicates that the confirmation prompt should not be displayed, the communication device 102*a* may proceed to make the attempted call or send the attempted message.

In some cases, the server 124 may send a contact's schedule-based prompt data 170 (FIG. 9) to the communication device 102*a* (and/or the contact's schedule-based prompt data 170 may have been created, edited and/or stored on a storage device of the communication device 102*a*); and the communication device 102*a* may access the current time for a location associated with the contact 110, for instance, by generating the current time as discussed above with reference to FIGS. 1-4. In such cases, the communication device 102*a* may, at a block 168, use the contact's schedule-based prompt data 170 and the current time to determine whether to display the confirmation prompt. At the block 162, the confirmation prompt may be displayed if the communication device 102*a* determines that the confirmation prompt should be displayed. However, if the communication device 102*a* determines that the confirmation prompt should not be displayed, the communication device 102*a* may proceed to make the attempted call or send the attempted message.

Figure 9:
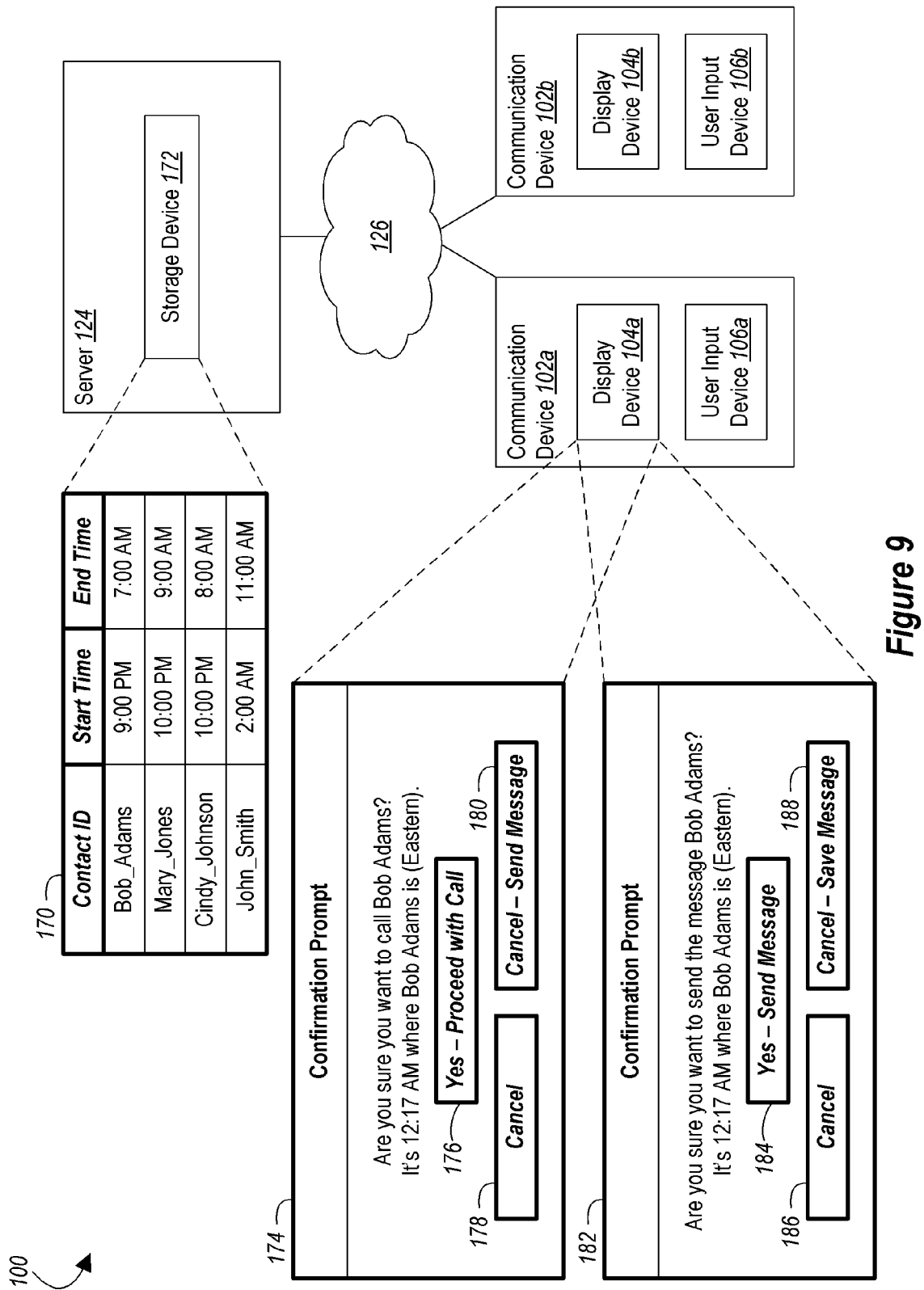
FIG. 9 is a diagram of an exemplary communications system.

As shown in FIG. 9, the schedule-based prompt data 170 for a contact 110 may include, in one instance, data indicating the contact ("Contact ID"), data indicating a start time for displaying the confirmation prompt ("Start Time"), data indicating an end time for displaying the confirmation prompt ("End Time"), and/or other schedule-based prompt data. In another instance, the schedule-based prompt data 170 for the contact 110 could include data indicating the contact ("Contact ID"), data indicating a start time for not displaying the confirmation prompt ("Start Time"), data indicating an end time for not displaying the confirmation prompt ("End Time"), and/or other schedule-based prompt data. In either instance, however, the schedule-based prompt data 170 advantageously indicates when the prompt should be displayed. If desired, the contact 110 could, for instance, create and/or change the schedule-based prompt data 170 by using a web portal, by setting preferences on a messaging program (such as, an instant messenger or an email program), or by any other suitable means.

Desirably, this may allow a contact 110 to create and maintain his or her own individual schedule and then allow the confirmation prompt to be displayed based on that schedule. For example, by comparing the current time for a location associated with the contact 110 and the "Start Time" of the schedule-based prompt data 170, the server 124 could determine that the confirmation prompt should be displayed and then push or otherwise send information indicating that the confirmation prompt should be displayed to the communication device 102*a*, which may then display the confirmation prompt in response. In another example, the server 124 may have already sent the schedule-based prompt data 170 (FIG. 9) to the communication device 102*a*, which may store the schedule-based prompt data 170 locally in a storage device of the communication device 102*a*. In this example, by comparing the current time for a location associated with the contact and the "Start Time" of the schedule-based prompt data 170, the communication device 102*a* could determine that the confirmation prompt should be displayed. The communication device 102*a* may display the confirmation prompt if the communication device 102*a* determines that the confirmation prompt should be displayed or, if the communication device 102*a* determines that the confirmation should not be displayed, may proceed to make the attempted call or send the attempted message.

Of course, a user of the communication device 102*a* could create and/or change the schedule-based prompt data 170 by using a web portal, using an interface provided on the communication device 102*a*, or by any other suitable means. In some instances, the schedule-based prompt data 170 may include default start times and end times, which may or may not be editable, and which may apply to individual contacts or (if desired) groups of contacts, such as some or all of the contacts listed on the communication device 102*a*.

In some instances, the communication device 102*b* of the contact 110 may be configured to perform some or all of the blocks 164, 166, 168, if desired. For instance, at the block 164, the contact's communication device 102*b* could access schedule-based prompt data 170 (e.g., schedule-based prompt data 170 stored locally on a storage device of the contact's communication device), access a current time for a location associated with the contact at block 166 (e.g., the location of the communication device 102*b* itself or a location specified by the contact), and at the block 168, use the contact's schedule-based prompt data 170 and the current time to determine whether the confirmation prompt should be displayed. The contact's communication device 102*b* could push or otherwise send information indicating whether the confirmation prompt should be displayed to the communication device 102*a* via the server 124, the connections or networks 126, and/or any other suitable means. The communication device 102a may then display the confirmation prompt if the information indicates that the confirmation prompt should be displayed. However if the information indicates that the confirmation prompt should not be displayed, the communication device 102a may proceed to make the attempted call or send the attempted message.

As shown in FIG. 9, the communication device 102a may be configured to display a schedule-based confirmation prompt 174 in response to an attempt to use the communication device 102a to call a contact 110. The confirmation prompt 174 may include a plurality of selectable user interface elements 176, 178, 180. In response to the selection of the user interface element 176, the communication device 102a may proceed to make the attempted call. In response to the selection of the user interface element 178, the communication device 102a does not make the attempted call. In response to the selection of the user interface element 180, the communication device 102a does not make the attempted call and may, instead, open a messaging interface used to create and/or send an SMS message, email message, etc.

As shown in FIG. 9, the communication device 102a may be configured to display a schedule-based confirmation prompt 182 in response to an attempt to use the communication device 102a to message a contact 110. The confirmation prompt 182 may include a plurality of selectable user interface elements 184, 186, 188. In response to the selection of the user interface element 184, the communication device 102a may proceed to send the message. In response to the selection of the user interface element 186, the communication device 102a may discard the message. In response to the selection of the user interface element 188, the communication device 102a may save the message for sending or deleting at a later time.

In one embodiment, the communication device 102a may be configured to display a schedule-based confirmation prompt 182 in response to an attempt to use the communication device 102a to author a message a contact 110. The confirmation prompt 182 may include a plurality of selectable user interface elements. In response to the selection of a first user interface element, the communication device 102a may proceed to open an message authoring user interface. In response to the selection of a second user interface element, the communication device 102a does not open the message authoring user interface.

The schedule-based confirmation prompts 174, 182 may include the presence data 112, which may be generated and displayed, for instance, as discussed above with reference to FIGS. 1-7.

If desired, the methods and systems described above may include and/or be implemented using a special purpose or general purpose telecommunication devices, including but not limited to wireless telephones; other telephony-enabled mobile devices; landline telephones; special purpose or general purpose computers that are adapted to have telecommunications or data networking capabilities (such as personal computers and cable or satellite set-top); and other telecommunication devices.

If desired, the methods and systems described above may include and/or be implemented using computer-readable media for carrying or having computer-executable instructions or electronic content structures stored thereon, and these terms are defined to extend to any such media or instructions that may be used with telecommunication devices or other communication devices.

By way of example, and not limitation, such computer-readable media can comprise RAM, ROM, EEPROM, CD-ROM or other optical disk storage, magnetic disk storage or other magnetic storage devices, or any other medium which can be used to store desired program code in the form of computer-executable instructions or electronic content structures and which can be accessed by a general purpose or special purpose computer, other computing devices, telecommunication devices or other communication devices.

The methods and systems described above require no particular component or function. Thus, any described component or function—despite its advantages—is optional. Also, some or all of the described components and functions described above may be used in connection with any number of other suitable components and functions.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A system comprising:
  a first communication device configured to display a contact and to display schedule-based presence information for the contact, the presence information generated using a schedule associated with the contact and a current time for a location associated with the contact, wherein the schedule comprises a plurality of time intervals, each interval comprising a start time, an end time, and a status for the contact associated with the each interval, and the presence information is generated using the status for an interval associated with the current time for a location associated with the contact.

2. The system as in claim 1, wherein the location associated with the contact comprises a location of a second communication device, the second communication device associated with the contact.

3. The system as in claim 1, wherein the location associated with the contact comprises a location of a mobile communication device, the mobile communication device associated with the contact.

4. The system as in claim 1, wherein the location associated with the contact comprises a location of a mobile communication device, the mobile communication device associated with the contact; and
  wherein the presence information is configured to be automatically changed in response to the mobile communication device being moved from one time zone to a different time zone.

5. The system as in claim 1, wherein the location associated with the contact comprises a location of a mobile communication device, the mobile communication device associated with the contact;
  wherein the first communication device is configured to use schedule-based presence data and data indicating a time zone associated with the contact to generate the presence information.

6. The system as in claim 5, wherein the first communication device is configured to receive, via at least one push from a server, the schedule-based presence data and the data indicating a time zone associated with the contact.

7. The system as in claim 5, further comprising:
  a server, the server configured to push the schedule-based presence data to the first communication device, the server configured to push the data indicating a time zone associated with the contact to the first communication device.

8. The system as in claim 5, wherein the first communication device is configured to receive the data indicating a time zone associated with the contact from a server that is configured to automatically send the data to the first communication device in response to the mobile communication device being moved from one time zone to a different time zone.

9. The system as in claim 5, further comprising:
a server configured to automatically send the data indicating a time zone associated with the contact to the first communication device in response to the mobile communication device being moved from one time zone to a different time zone.

10. The system as in claim 1, further comprising:
a server, the server configured to use schedule-based presence data and data indicating a time zone associated with the contact to generate the presence information, the server configured to push the generated presence information to the first communication device.

11. A system comprising:
a first communication device configured to, in response to an attempt to use the first communication device to call or message a contact, display a scheduled-based confirmation prompt based on a schedule associated with the contact and a current time for a location associated with the contact wherein when the schedule indicates that a status for the current time for a location associated with the contact is a time during which the contact should not receive a call or message and in response to the schedule indicating that the current time for a location associated with the contact is a time during which the contact should not receive a call or message, the first communication device configured to refrain from making the call or sending the message until a selectable user interface element of the confirmation prompt is selected, wherein selecting the selectable user interface element causes the first communication device to ignore the status and immediately call or message a contact regardless that the current time associated with the contact is a time during which the contact should not receive a call or message.

12. The system as in claim 11, wherein the confirmation prompt includes a first selectable user interface element and a second selectable user interface element;
wherein the first communication device is configured to, in response to a selection of the first selectable user interface element, make the call or send the message; and
wherein the first communication device is configured to, in response to a selection of the second selectable user interface element, not make the call or not send the message.

13. The system as in claim 11, wherein the confirmation prompt further includes presence information for the contact, the presence information generated using a schedule associated with a contact and a current time for a location associated with a contact.

* * * * *